(12) United States Patent
Lawson et al.

(10) Patent No.: US 11,152,016 B2
(45) Date of Patent: Oct. 19, 2021

(54) AUTONOMOUS INTELLIGENT RADIO

(71) Applicant: SRI International, Menlo Park, CA (US)

(72) Inventors: Aaron D. Lawson, San Jose, CA (US); Harry Bratt, Mountain View, CA (US); Mitchell L. McLaren, Alderley (AU); Martin Graciarena, Belmont, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 212 days.

(21) Appl. No.: 16/407,009

(22) Filed: May 8, 2019

(65) Prior Publication Data

US 2020/0184997 A1 Jun. 11, 2020

Related U.S. Application Data

(60) Provisional application No. 62/778,196, filed on Dec. 11, 2018.

(51) Int. Cl.
*G10L 25/84* (2013.01)
*H04L 27/00* (2006.01)
(Continued)

(52) U.S. Cl.
CPC .............. *G10L 25/84* (2013.01); *G06N 20/00* (2019.01); *G10L 15/16* (2013.01); *G10L 15/22* (2013.01);
(Continued)

(58) Field of Classification Search
CPC ....... G10L 15/00; G10L 15/005; G10L 15/16; G10L 15/22; G10L 25/00; G10L 25/84;
(Continued)

(56) References Cited

U.S. PATENT DOCUMENTS 10,003,483 B1 * 6/2018 Migliori .............. H04L 27/0012
10,396,919 B1 * 8/2019 O'Shea .............. H04B 17/3913
(Continued)

OTHER PUBLICATIONS

Wikipedia, "Software-defined Radio", https://en.wikipedia.org/wiki/Software-defined_radio, last viewed on Aug. 14, 2019, 9 pages.
(Continued)

*Primary Examiner* — Paras D Shah
*Assistant Examiner* — Sean E Serraguard
(74) *Attorney, Agent, or Firm* — Shumaker & Sieffert, P.A.

(57) ABSTRACT

Embodiments of the disclosed technologies include finding content of interest in an RF spectrum by automatically scanning the RF spectrum; detecting, in a range of frequencies of the RF spectrum that includes one or more undefined channels, a candidate RF segment; where the candidate RF segment includes a frequency-bound time segment of electromagnetic energy; executing a machine learning-based process to determine, for the candidate RF segment, signal characterization data indicative of one or more of: a frequency range, a modulation type, a timestamp; using the signal characterization data to determine whether audio contained in the candidate RF segment corresponds to a search criterion; in response to determining that the candidate RF segment corresponds to the search criterion, outputting, through an electronic device, data indicative of the candidate RF segment; where the data indicative of the candidate RF segment is output in a real-time time interval after the candidate RF segment is detected.

33 Claims, 7 Drawing Sheets

(51) Int. Cl.
*H04H 60/48* (2008.01)
*H04H 60/70* (2008.01)
*G10L 15/16* (2006.01)
*G06N 20/00* (2019.01)
*G10L 15/22* (2006.01)
*G10L 15/08* (2006.01)
*G10L 15/00* (2013.01)

(52) U.S. Cl.
CPC ............ *H04H 60/48* (2013.01); *H04H 60/70* (2013.01); *H04L 27/0012* (2013.01); *G10L 15/005* (2013.01); *G10L 2015/088* (2013.01)

(58) Field of Classification Search
CPC .. G10L 2015/088; G06N 20/00; H04H 60/00; H04H 60/48; H04H 60/70; H04L 27/00; H04L 27/0012
See application file for complete search history.

(56) References Cited

U.S. PATENT DOCUMENTS

| | | | |
|---|---|---|---|
| 2005/0114118 A1* | 5/2005 | Peck | G10L 25/87 704/208 |
| 2012/0059657 A1* | 3/2012 | Willey | G01S 13/50 704/256.1 |
| 2012/0130713 A1* | 5/2012 | Shin | G10L 25/78 704/233 |
| 2018/0211179 A1* | 7/2018 | Dzierwa | G06N 20/00 |
| 2020/0058320 A1* | 2/2020 | Liu | G10L 15/22 |

OTHER PUBLICATIONS

Radio.net, "Welcome to radio.net", https://corporate.radio.net/, last viewed on Aug. 14, 2019, 1 page.
GNU Radio, "About GNU Radio", https://www.gnuradio.org/about, dated 2019, 1 page.

* cited by examiner

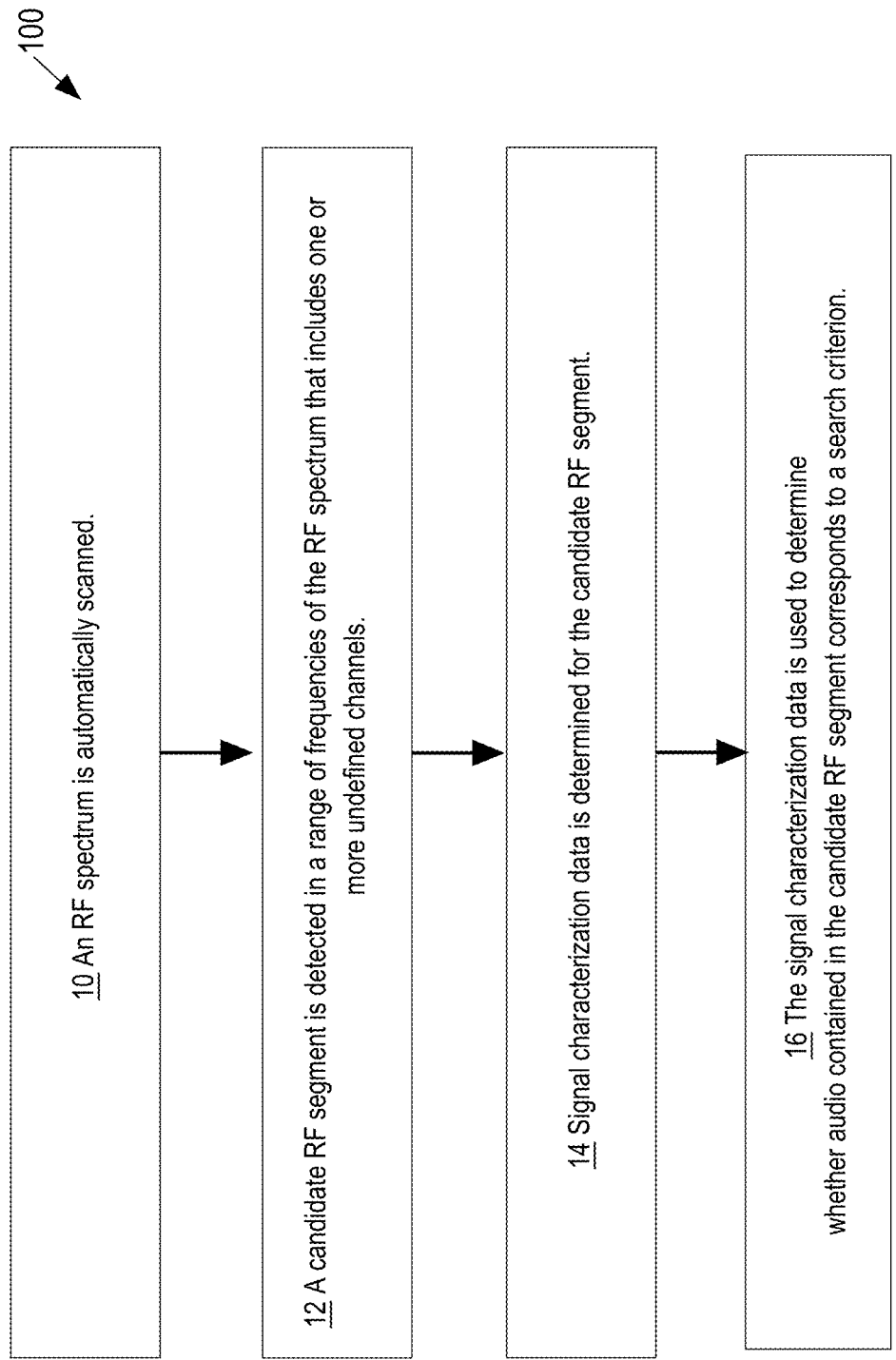

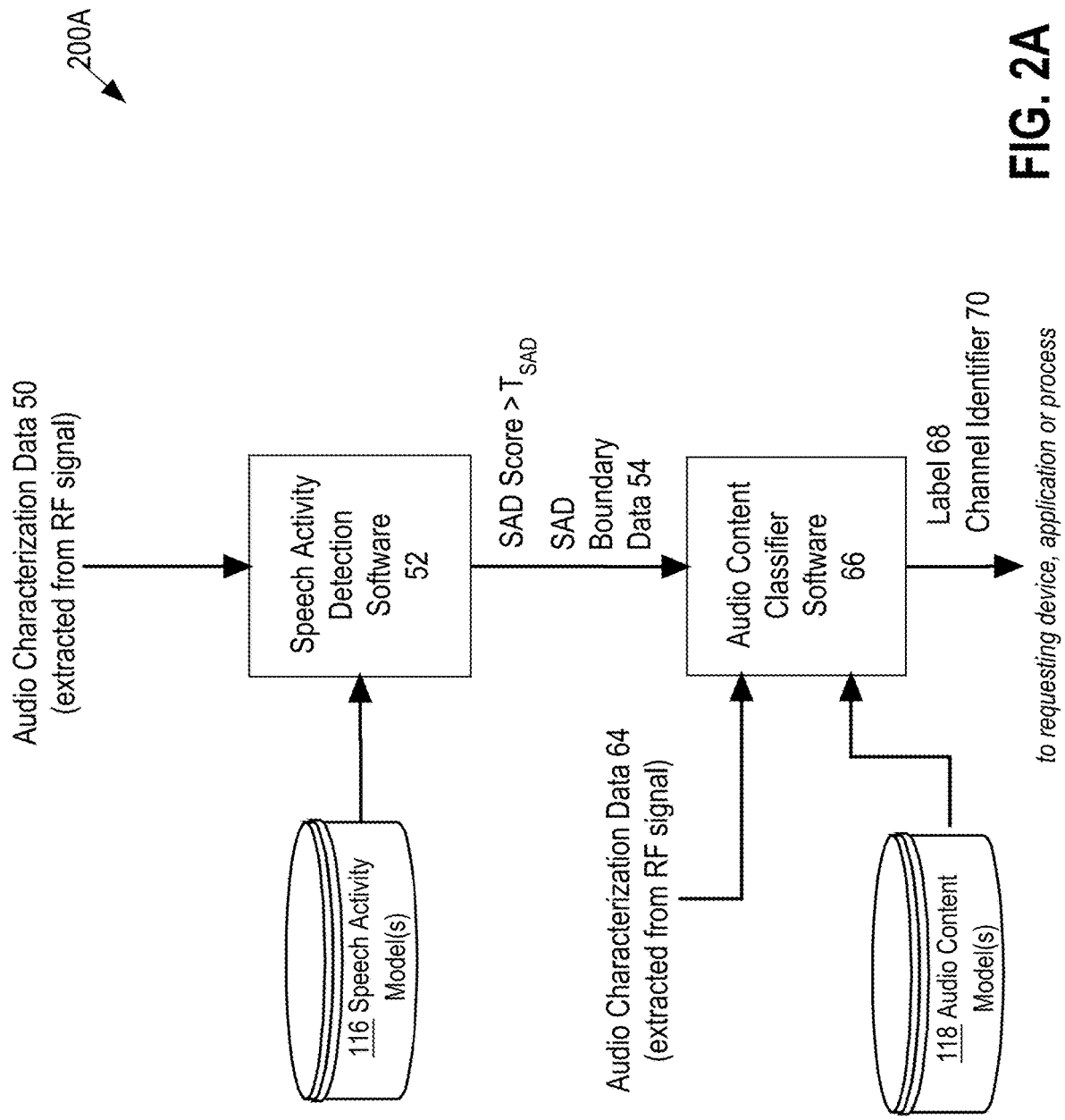

AUTONOMOUS INTELLIGENT RADIO

BENEFIT CLAIM

This application claims the benefit of Provisional Appln. 62/778,196, filed Dec. 11, 2018, the entire contents of which is hereby incorporated by reference as if fully set forth herein, under 35 U.S.C. § 119(e).

GOVERNMENT RIGHTS

This invention was made with Government support under contract number HR0011-15-C-0037 awarded by the Defense Advanced Research Projects Agency. The Government has certain rights in this invention.

TECHNICAL FIELD

Technical fields of this disclosure include computational methods for automating the classification of speech content of a radio frequency (RF) signal. Other technical fields of this disclosure include radio scanners and software-defined radio technologies.

BACKGROUND

Broadcast radio uses radio waves to transmit audio. Radio transmissions can reach a wide audience, particularly when extended through the use of satellite transmitters. In contrast to Internet radio, broadcast radio signals can be received without an Internet connection.

Radio scanners include radio receivers that can automatically tune, or scan, two or more discrete frequencies. Software-defined radio (SDR) is a radio communication system in which radio components that have been traditionally implemented in hardware are instead implemented by means of software on a computer.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 is a flow diagram of a process, in an embodiment;

FIG. 2A is a block diagram of a software-based system, in an embodiment;

Figure 2B:
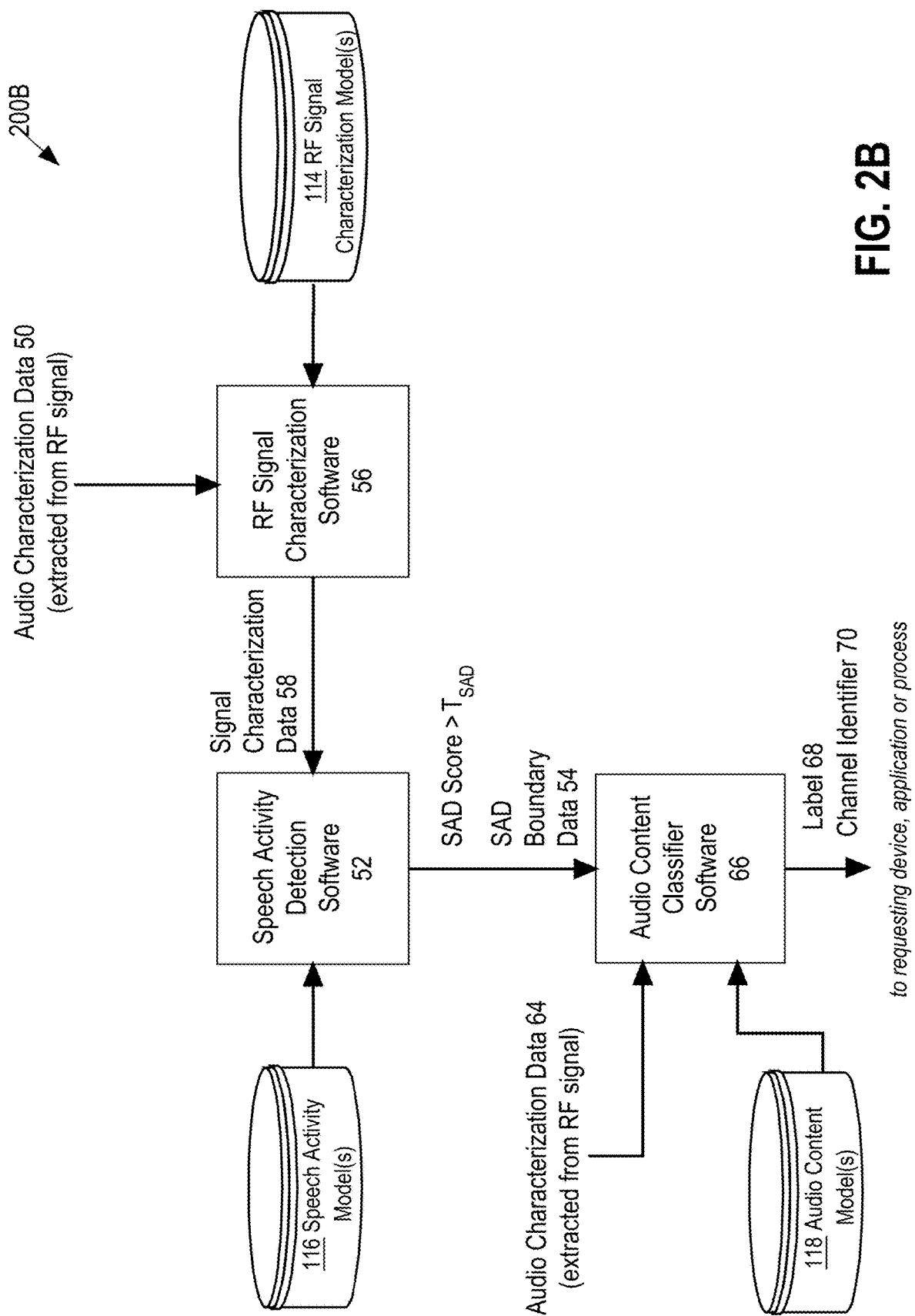
FIG. 2B is a block diagram of a software-based system, in an embodiment.

While the present invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In some regulated bands of the RF spectrum, transmitted audio may be accompanied by metadata. For example, the Radio Data System (RDS) is a communications protocol standard for embedding small amounts of digital information in conventional FM radio broadcasts. The RDS is commonly used by commercial radio stations to include the song title or artist along with a transmission of music. Smart radio tuners may use the metadata provided by RDS to search the regulated RF space, for example to find a radio station that is currently playing a particular song.

However, one shortcoming of metadata-based radio searching is the lack of disambiguation, which leads to inaccurate search results. In one recent example, a radio search for stations playing songs by "Ryan Adams" incorrectly returned radio stations that were playing music by Bryan Adams, a completely different artist with a much different sound.

Another shortcoming of metadata-based radio searching is that the searching is only effective if metadata is available. Metadata-based searching will not find transmissions that do not include metadata that matches the search criteria.

Still another shortcoming of metadata-based radio searching is that the searching is limited by the amount of metadata that is provided along with a transmission. Typically, only small amounts of metadata are transmitted to avoid taking up too much of the station's available bandwidth. For example, metadata included with FM transmissions typically is limited to station identifier, song title and artist name. Thus, metadata-based searching cannot be used to search for characteristics of a transmission that are not reflected in the metadata.

Yet another shortcoming of metadata-based searching is that it relies on adherence to a communications protocol such as a particular version of the RDS standard. Metadata that is transmitted using some protocol other than the one that is the assumed standard may not be found by the searcher.

Embodiments of this disclosure address the need for autonomous identification of audio characteristics, such as speech-related content, of RF signals across an RF spectrum that may contain many known and/or unknown channels, whether or not the transmissions include metadata, and/or whether the signals are transmitted in regulated or unregulated portions of the RF spectrum.

Embodiments of this disclosure address the disambiguation issues of metadata-based approaches because the disclosed approaches use audio characteristics of the RF signal, rather than metadata, to identify target content. The disclosed solutions can be used as an alternative to metadata-based approaches or to supplement such approaches, where metadata is available.

Moreover, the disclosed approaches are effective when no metadata is available or where the communication protocol is unrecognized, such as may be common in unregulated channels. Another benefit of the disclosed approaches is that they are only limited by the audio characteristics of the signals themselves, without regard to the amount of metadata that may or may not be available. Thus, using the disclosed technologies, any signature characteristic of an RF signal, not just its metadata, can be used as a search criterion to find similar content within the same transmission or in other transmissions on other frequencies or channels.

Some examples of audio characteristics that can be searched for and found using the disclosed metadata-independent technologies, but not by prior approaches, include particular languages, dialects, or accents of speech, independently of the particular speaker that is speaking; particular sounds, such as car crashes or fire engines; particular voice characteristics, such as yelling, whispering, adult voices, child voices, and/or others.

In an embodiment, machine-learned classifier(s) are applied directly to data extracted from an RF signal, such that output of the classifier(s) can be used by downstream processing, for example to determine whether the content of the RF signal matches a search criterion.

In an embodiment, the disclosed technologies include a method for finding a radio frequency (RF) signal that contains speech content of interest in real-time, while an RF spectrum that includes one or more undefined channels is automatically monitored, for example by a radio scanner, where audio characterization data may be used as a search criterion alternatively or in addition to metadata.

One example of audio characterization data is a model that is created by applying a feature extraction process to an enrollment segment of RF signal data. An enrollment segment may be obtained through a formal enrollment process, such as when a particular user is prompted to and does speak into a push-to-talk radio, or through an ad-hoc computer-facilitated process.

In an embodiment, an enrollment segment can be created on the fly. For example, a computer operator may be listening to broadcast audio and through an interactive element of a graphical user interface, simply tag or otherwise assign a label to a particular portion of audio of the RF segment that is of interest, while continuing to listen to the audio. Irrespective of how enrollment is achieved, the audio characterization data of the enrollment segment links the enrollment segment to one or more labels. Examples of labels include text that serves to identify the segment and/or indicate any one or more of: a particular speaker name, a particular language, a particular keyword, a particular acoustic event, a particular geo-location, or some other audio characteristic of the segment that may be of interest. Alternatively or in addition, a label may simply include a distinctive identifier, such as a number or combination of alphanumeric characters that uniquely identifies the audio portion of interest without necessarily describing the content of the audio portion.

Features may be extracted from the enrollment segment in accordance with audio characteristic(s) of interest for a particular searching task. For example, if a search task calls for finding other speech in the RF spectrum by the same speaker, the model created using the enrollment segment will identify features of the audio that have a high likelihood of being distinctive or unique to that speaker.

Alternatively or in addition, features may be extracted from the enrollment segment and modeled such that the combination of extracted features represents many different characteristics of the segment, any one or more of which may have a high likelihood of being distinctive or unique to the segment as a whole. For example, an enrollment segment that is captured while a person is speaking during a thunderstorm may have features extracted that are indicative of a thunderclap, the sound of rain, the person's voice, and the language in which the person is speaking. As a result, the enrollment segment may be used to search for other audio in the RF spectrum that matches any one or more of those criteria: a thunderclap, rain, a particular speaker, a particular language.

In some embodiments, audio characterization data is extracted from the RF segment without prior demodulation of the RF segment. In other embodiments, audio characterization data is extracted after demodulation. In still other embodiments, audio characterization data is extracted after execution of a speech activity detection process that identifies the presence of speech activity in the RF segment, with or without demodulation. As such, audio characterization data may refer to audio features of the baseband signal or audio features of the carrier wave plus the baseband signal.

In an embodiment, the audio characterization data can be used to locate, anywhere in the regulated and/or unregulated RF spectrum, RF signals that have corresponding audio characterization data. For example, a radio scanner continuously scanning a very wide range of frequencies of the RF spectrum can, based on the audio characterization data, identify matching audio characterization data on any channel, whether the channel is defined or undefined, regulated or unregulated.

In an embodiment, when the radio scanning process finds matching audio characterization data, the segment(s) of RF signal data in which the matching audio characterization data was found are identified. In an embodiment, the identified segment(s) are output, alone or with the corresponding labels through an electronic device that is communicatively coupled to the radio scanner. For example, identified segment(s) and/or their corresponding labels may be output to an electronic file or to a graphical user interface screen or through a speaker using, for example, text-to-speech (TTS) technology. In an embodiment, the identified segment(s) are labeled in a real-time time interval after the scanning process finds the matching audio characterization data.

As used herein, the term real time may refer to an actual period of time during which a process or event occurs. For example, real time may refer to the ability of a computer system to receive an input and analyze and provide virtually immediate output in response to the input. In the context of audio processing, real-time often indicates that the amount of time to process an example of N seconds of audio takes N seconds. In some embodiments, real-time may refer to faster than real time processing that results in a real-time experience for the end user (for example, the processing can keep up with an infinite incoming stream of audio). In some embodiments, real time is measured in milliseconds. In other embodiments, real time is determined based on an end user's perception of system responsiveness.

In an embodiment, the machine-learned classifier(s) are implemented using a deep neural network (DNN), which has been trained to recognize one or more audio characteristics of an RF signal. In an embodiment, an output of the DNN classifier indicates a mathematical likelihood of the presence of a particular semantic class in the RF signal. Examples of DNN output include probabilistic or statistical predictive data values for each target class, where a target class corresponds to, for example, an enrolled language or an enrolled speaker.

The particular audio characteristics that are used to create the machine-learned model(s) and classify input segments may vary depending based on the particular classification task(s) that are desired (e.g., speaker recognition, language recognition, keyword recognition, acoustic event recognition, etc.). In an embodiment, a DNN outputs bottleneck features that are used as audio characterization data. Examples of techniques for obtaining bottleneck features are described in U.S. Pat. No. 10,133,538 to McLaren et al. and U.S. Patent Application Publication No. 2016-0248768 to McLaren et al.

Process Overview

FIG. 1 illustrates an example process 100 in which aspects of the present disclosure may be implemented. Process 100 is implemented in software, hardware, or a combination of software and hardware. In an embodiment, process 100 is embodied in computer program code schematically depicted in FIG. 2 as a number of software-based components that are described in more detail below. The software-based component(s) in which process 100 is embodied are executable by processor(s); for example by computing device(s) 110, 140 shown in FIG. 3, described in more detail below.

In operation 10, an RF spectrum is automatically scanned for a radio frequency (RF) signal that contains content of interest. In an embodiment, operation 10 includes scanning the range of frequencies of the RF spectrum for RF segments (or 'blips'), where the RF segment is a frequency-bound time segment of electromagnetic energy.

In an embodiment, the RF spectrum is scanned by a radio scanner that is configured to monitor the RF spectrum for the presence of RF transmissions on a periodic or continuous basis. In an embodiment, the radio scanner is configured to scan a portion of the RF spectrum that includes one or more unknown channels. In an embodiment, the radio scanner is configured to scan an unregulated portion of the RF spectrum.

In an embodiment, the radio scanner is configured to continuously scan a very wide range of the RF spectrum. For example, the RF spectrum that is continuously scanned in an embodiment is defined by a frequency range of about 3 megahertz (MHz) to about 30 MHz. The disclosed technologies are equally applicable to other radio frequency ranges and the foregoing is provided as an example of one embodiment.

In an embodiment, the radio scanner includes a software defined radio (SDR). In an embodiment, GNU Radio components are used to build the SDR. In an embodiment, the radio scanner is embodied in one or more of: a computing device, a network of computing devices, an embedded system, a network appliance. For example, portions of the radio scanner and/or other disclosed technologies may be implemented in a mobile computing device such as a smart phone or a smart watch, a motor vehicle, an autonomous vehicle, an unmanned aerial vehicle (UAV), a robot, a push-to-talk device.

In operation 12, a candidate RF segment is detected in the range of frequencies of the RF spectrum that includes one or more undefined channels. In an embodiment, the candidate RF segment is detected by measuring the energy level of the blip and comparing the measured energy level to a threshold value. If the energy level of the blip is greater than the threshold energy level, the blip is considered as a candidate RF segment for further analysis. The threshold value used to detect blips is determined based on the requirements of a particular design or implementation, but generally corresponds to an amount of energy that indicates some form of audio activity on the RF frequency.

In operation 14, signal characterization data is determined for the candidate RF segment. Signal characterization data includes, in an embodiment, one or more of: frequency range or band, modulation type, timestamp. In an embodiment, a machine learning-based process is used to determine the signal characterization data for the candidate RF segment. The signal characterization data produced by operation 14 is output for use by one or more processes of operation 16.

In operation 16, the signal characterization data produced by operation 14 is used to determine whether audio contained in the candidate RF segment corresponds to a search criterion. Examples of search criteria include but are not limited to speech activity, speaker identification (SID), acoustic event detection, keyword detection. In some embodiments, the search criterion is received from an end user, for example via a graphical user interface or other input device. In other embodiments, search criteria is derived from previously analyzed portions of the RF spectrum. In some embodiments, operation 16 analyzes the candidate RF segment for multiple search criteria. For example, search criteria may include a combination of speaker identity and language, language and keyword, acoustic event and speaker, or speaker and keyword.

In operation 16, at least a portion of the signal characterization data is used to make the determination as to whether audio contained in the candidate RF segment corresponds to a search criterion. In embodiment, one or more models used to analyze the RF segment are trained according to modulation type and signal characterization data is used as a parameter to select a model for performing the analysis of the candidate RF segment.

In some embodiments, operation 16 includes demodulating the RF segment and extracting audio features from the baseband signal. In other embodiments, features used to analyze the audio content of the RF segment are extracted from the RF segment without demodulation.

In some embodiments, operation 16 includes extracting a first set of audio features from the candidate RF signal that was detected in operation 12. The first set of features is classified, using one or more first learned models, as indicating that the candidate RF signal contains speech or does not contain speech in the RF spectrum. In an embodiment, the first set of features includes audio characterization data that are indicators of speech activity. For example, the first set of features may include acoustic features, such as cepstral, spectral, spectral-temporal or noise-robust features, lexical features, phonetic features, lattice features, confidences, and/or others. In an embodiment, the first set of features is input to a machine-learned model and the model outputs an indication or prediction, for example a probabilistic value, which indicates whether the first set of features likely does or likely does not contain speech.

In an embodiment, an automated speech activity detection (SAD) technique is used in operation 16, which has been adapted to process RF segments. In some embodiments, cyclostationarity is used to detect and characterize RF signals; that is, by modeling the RF signal as a cyclostationary process. Cyclostationarity reveals unique features and signatures of different modulation types, is robust to noise and interference, and can be used when channel information is unknown or not available (such as may be the case in unregulated portions of the RF spectrum).

In some embodiments, when the first set of features has been classified by operation 16 as containing speech, a second set of features is extracted from the RF segment or blip and classified, using one or more second learned models, as matching a speech-related criterion or not matching the speech-related criterion. In an embodiment, the second set of features may include one or more of the same features that are used in operation 16 to detect speech, while in other embodiments, the first and second sets of features may be mutually exclusive.

The second set of features includes audio characterization data that potentially match audio characterization data associated with the speech-related criterion. Examples of speech-related criteria include search criteria such as audio characteristics of a known speech segment or an enrolled segment for which a match is sought. For instance, the speech-related criteria may specify audio characteristics of a person's speech so that other instances of that same person's speech may be detected, either on the same RF channel or on other channels. As another example, the speech-related criteria may specify audio characteristics of the language in which a segment of speech is spoken, so that other instances of speech in that same language may be detected, whether spoken by the same speaker or different speakers, and either on the same RF channel or on other channels.

In an embodiment, operation 16 includes inputting the potentially matching audio characterization data extracted from the RF signal to one or more machine-learned models that have been trained to recognize, in an audio signal, any one or more of: a particular speaker, a particular language, a particular keyword, a particular acoustic event, a particular geo-location, a particular frequency band, a particular modulation type, a particular geo-location. The one or more machine-learned models output data indicating a likelihood or prediction as to whether the potentially matching audio characterization data of the second set of features matches the speech-related criterion or does not match the speech-related criterion.

In response to determining that the candidate RF segment corresponds to the search criterion, data indicative of the candidate RF segment is output through an electronic device. In an embodiment, the data indicative of the candidate RF segment is output in a real-time time interval after the candidate RF segment is detected. In an embodiment, data indicative of the candidate RF segment includes one or more of: frequency range or band, modulation type, timestamp, label; where a label indicates that the RF segment matched the search criterion.

In embodiment, process 100 outputs a digital alert or digital notification, or other form of output, when the second set of features matches the speech-related criterion. In an embodiment, the alert includes any one or more of: a label, a message, a scanner control signal. For example, the output may include a display of a label alongside a portion of a waveform that has the audio characteristic identified by the label, or the output may include a text or voice message to a user indicating that searched-for audio characteristic has been found, or the output may include a control signal that is sent to the radio scanner to cause the scanner to tune to the channel on which the searched-for audio characteristic was found, or the output may include a control signal that is sent to the radio scanner to cause the scanner to adjust a position of an antenna used to receive RF signals or to adjust a location on an antenna from which signals are received.

In an embodiment, process 100 analyzes multiple different RF segments during the automatic radio scanning. For example, embodiments of process 100 may find the search criterion on the same channel at different timestamps or on different channels at different timestamps.

In an embodiment, operation 16 includes, using the audio characterization data and the matching audio characterization data, determining that a first segment and a second segment both contain speech of a same speaker and the second segment contains speech of the same speaker spoken in a different language than the first segment, where the first and second segments are extracted from different channels. Alternatively or in addition, operation 16 includes, using the audio characterization data and the matching audio characterization data, determining that a first segment and a second segment both contain speech that includes a same keyword and the second segment contains the same keyword spoken in a different language than the first segment, where the first and second segments are extracted from different channels.

Example Arrangement of Software-Based Components

Figure 2C:
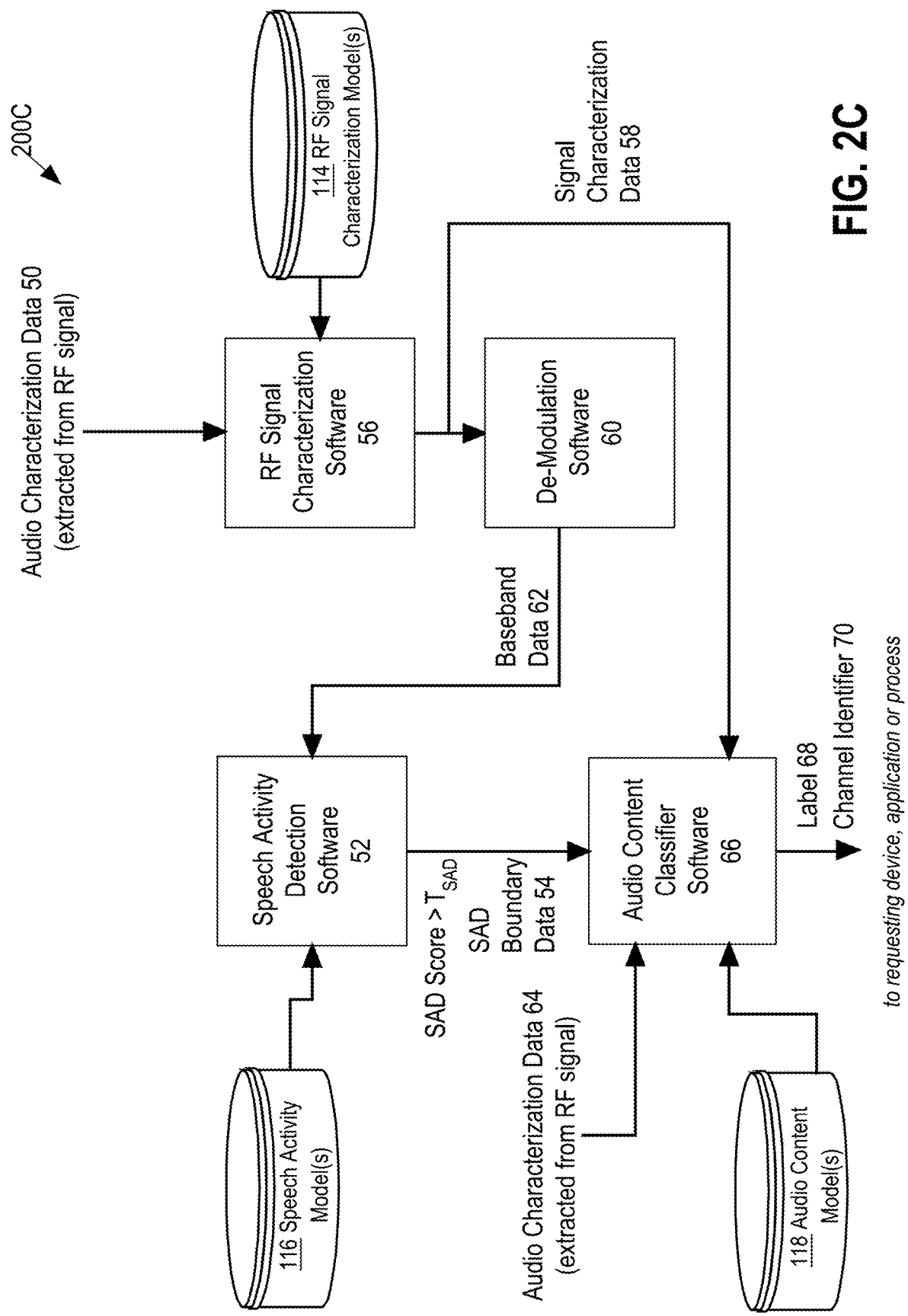
FIG. 2C is a block diagram of a software-based system, in an embodiment.

FIGS. 2A, 2B, and 2C illustrate example arrangements of software-based components of a system 200A, 200B, 200C, respectively, in which aspects of the present disclosure may be implemented. In an embodiment, the software-based components include speech activity detection (SAD) software 52, RF signal characterization software 56, de-modulation software 60, audio content classifier software 66, as well as digital data including audio characterization data 50, SAD boundary data 54, signal characterization data 58, baseband data 62, audio characterization data 64, label 68, channel identifier 70, and learned models including RF signal characterization model(s) 114, speech activity model(s) 116, audio content model(s) 118. The software-based component(s) 52, 56, 60, 66 and models 114, 116, 118 in which portions of process 100 may be embodied are programmed using computer code that is executable by processor(s); for example computing device(s) 110, 140, display device 142, antenna 144, shown in FIG. 3, described in more detail below.

In FIG. 2A, audio characterization data 50 is extracted from an RF segment and directly input to/received by speech activity detection software 52. Speech activity detection software 52 uses speech activity model(s) 116 to analyze audio characterization data 50 and generate a SAD score. In the embodiment of FIG. 2A, speech activity model(s) 116 include models for all types of modulations. For example, speech activity model(s) 116 may include one model per modulation type (i.e., each model is trained with training data containing RF segments of a particular modulation type), where the audio characterization data 50 is input to each model, each model outputs a score, and modulation type and speech content activity in the RF spectrum is indicated by analysis of the SAD scores output by the models. For example, the highest SAD score may indicate both the modulation type and the presence of speech content activity.

The SAD score indicates whether, based on audio characterization data 50, the RF segment likely contains speech. In an embodiment, SAD boundary data 54 is output by speech activity detection software 52. SAD boundary data 54 indicates, for example, time interval(s) and/or frequency band(s) during which speech activity was detected in the RF segment by SAD software 52.

When the SAD score exceeds a threshold, $T_{SAD}$, in an embodiment, audio characterization data 64 is directly input to audio content classifier software 66.

In the embodiment of FIG. 2B, audio characterization data 50 is input to RF signal characterization software 56 independently of, concurrently with, or prior to the processing done by speech activity detection software 52. For example, in an embodiment, RF signal characterization software 56 analyzes audio characterization data 50 to determine signal characterization data, such as frequency range and/or channel type and or timestamp (e.g., band, channel type) for the RF signal, and then SAD software 52 uses the signal characterization data to inform its speech activity analysis. In the embodiment of FIG. 2B, signal characterization data 58 is used to select and use the most appropriate model of speech activity models 116. A most appropriate model may be, for example, a model that corresponds to a modulation type (i.e., a model trained on RF segments that have not been demodulated but their modulation type is known), where the modulation type is determined by the signal characterization software 56.

The threshold $T_{SAD}$, includes a data value or a range of data values, for example a confidence value. The threshold $T_{SAD}$ is determined in accordance with the requirements of a particular implementation of the system 200. For example, if a particular implementation is only concerned with speech-related audio characteristics, the threshold $T_{SAD}$ may be set higher and if the implementation is alternatively or in addition concerned with non-speech audio characteristics, such as particular non-speech sounds or background noise, the threshold $T_{SAD}$ may be set lower.

In an embodiment, RF signal characterization software 56 uses SAD boundary data 54 and RF signal characterization model(s) 114 to determine the nature of the RF signal, for example the frequency band or channel or modulation type or geo-location of the RF segment. Examples of modulation types include AM (amplitude modulation), FM (frequency modulation), UHF (ultra-high frequency), VHF (very high frequency), and/or others. Channels and frequency bands may be dependent on the modulation type. For example, AM channels are defined by frequency bands in kilohertz (KHz) while FM channels are defined by frequency bands in MHz.

In an embodiment, RF signal characterization software 56 uses RF signal characterization model 114 to analyze a portion of the RF signal defined by SAD boundary data 54, and outputs signal characterization data 58. In an embodiment, signal characterization data 58 includes a label that identifies a modulation type and/or a frequency band or channel type or a geo-location that is associated with the RF segment. In an embodiment, signal characterization data is used to demodulate the blip prior to extracting potentially matching audio characterization data from the blip.

In some embodiments, SAD boundary data 54 is used to clarify transmission boundaries (e.g., frequency bands) and to determine line of bearing (LOB) data. Line of bearing data as clarified using SAD boundary data 54 is used for localization. As such, the clarified LOB data enables improved geo-location of the transmitter of the RF signal. In some embodiments, RF signal characterization software 56 uses the refined LOB data to geo-locate the transmitter and outputs the geo-location data as part of signal characterization data 58.

The geo-location is then provided to audio content classifier software 66 and used to inform content detection and downstream activities such as to control the radio scanning. For example, localization data enables the system to distinguish between two different voices who are speaking on the same channel but who are located at two different geo-locations.

Geolocation data obtained in this way can be used to control the tuning of the radio scanner, e.g., by adjusting the position of an antenna or adjusting the location on an antenna at which the RF signal is received. For example, the scanner can be automatically tuned to frequencies that are stronger at the identified geo-location. Geo-location data may also be combined with voice data to detect movement of a person transmitting the audio. For example, localization data in combination with speaker identity data enables the system to determine that a particular speaker has moved from one geo-location to another geo-location irrespective of whether the speaker may still be speaking on the same RF channel or a different channel.

In the embodiment of FIG. 2C, audio characterization data 50 is input to RF signal characterization software 56 and signal characterization software 56 outputs signal characterization data 58. Signal characterization data 58 is input to de-modulation software 60. De-modulation software 60 uses signal characterization data 58 to determine which type of de-modulation to perform, and to perform the appropriate type of de-modulation on the RF signal. As such, de-modulation software 60 extracts or recovers the baseband signal, e.g., the informational content of the RF signal, from the carrier wave. De-modulation software 60 outputs baseband data 62. Baseband data 62 includes informational content of the RF signal. In an embodiment, baseband data 62 is input to speech activity detection software 52, which applies speech activity detection on the audio content of the broadband signal using a speech/non-speech activity detection model.

In an embodiment, audio content classifier software 66 uses baseband data 62, SAD boundary data 54, and audio content model(s) 118 to classify the RF signal as belonging to a particular content class or not belonging to a particular content class. In other embodiments, audio content classifier software 66 operates directly on audio characterization data 64 which has been extracted from the RF signal but has not been demodulated. Audio content classifier software 66 assigns one or more label(s) 68 to the RF signal, which indicate the content class(es) determined by audio content classifier software 66 to be present in the RF signal. Label(s) 68 may include a channel identifier 70, which identifies the channel on which RF signal was transmitted, or channel identifier 70 may be output in addition to label(s) 68. In some embodiments, timestamp data is included with channel identifier 70 or is included in addition to channel identifier 70.

In some embodiments, SAD boundary data 54 enables system 200 to limit its computational efforts and processing to only those portions of the RF signal that are desired to be classified; for example, those portions of the RF signal that contain speech, and to skip over portions of the RF signal that do not contain speech or otherwise are not desired to be classified. In digital radio embodiments, RF signal characterization software 56 and de-modulation software 60 may be omitted as the radio signal is already in digital form.

Example Networked Computing Environment

Figure 3:
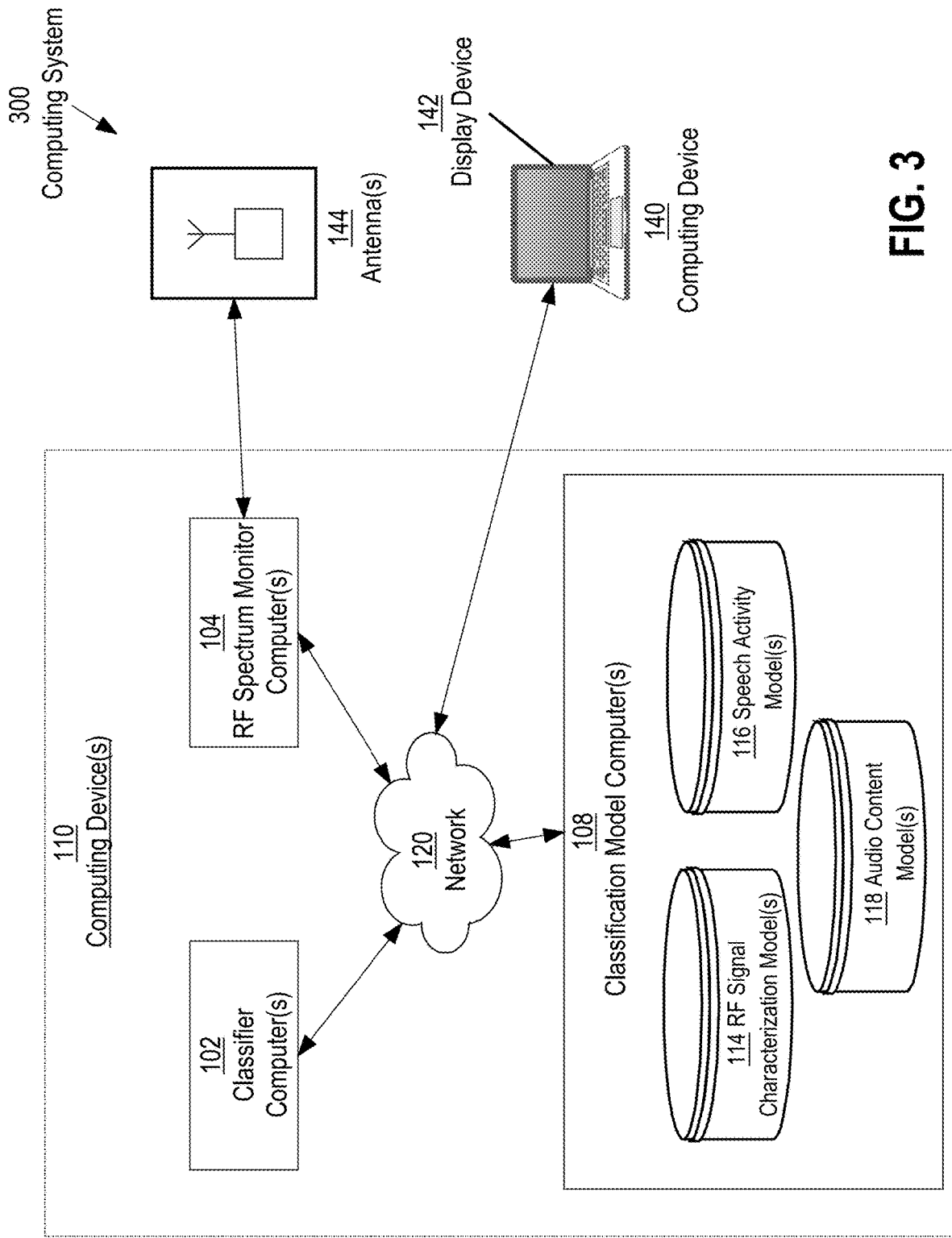
FIG. 3 is a block diagram of a networked computing environment, in an embodiment.

FIG. 3 illustrates an example computing system 300 in which aspects of the present disclosure may be implemented. In the example of FIG. 3, computing system 300 includes at least computing device(s) 110, a computing device 140, a display 142, and an antenna 144, which are communicatively coupled to an electronic communications network 120. In an embodiment, computing device 140 is a client computing device, such as a laptop computer, a desktop computer, a mobile computing device, a smart phone, a smart speaker, a wearable computing device, a smart appliance, or other computing device, while a computing device 110 is a server computer or network of server computers connected to the Internet, in the cloud, for example. In an embodiment, computing device 140 or computing device 140 includes or is communicatively coupled to an antenna 144.

Antenna 144 is any technological device that is capable of receiving RF signals over the air, for processing and analysis by radio receiver hardware and/or a computer, including but not limited to any type of antenna or antenna array. Antenna 144 may be embedded in a computing device such as computing device 104 or computing device 140, a push to talk (PTT) communication device, or a two-way radio transceiver, for example. In some embodiments, computing device 104 and/or computing device 140 and/or antenna 144 communicate with network 120 by wireless, wired, and/or optical connections.

Implemented in computing devices 110, 140 using computer software, hardware, or software and hardware, are combinations of automated functionality, data structures, and digital data, which are represented schematically in FIG. 3 as classifier computer(s) 102, RF spectrum monitor computer(s) 104, classification model computer(s) 108, RF signal characterization model(s) 114, speech activity model(s) 116, audio content model(s) 118.

In an embodiment, classifier computer(s) 102 stores and operates portions of classifier software 66; RF spectrum monitor computer(s) 104 performs radio scanning and stores and operates portions of speech activity detection software 52, RF signal characterization software 56 and de-modulation software 60; and classification model computer(s) 108 store and operate portions of audio content classifier software 66, all of which are described above with reference to FIG. 2.

In an embodiment, RF spectrum monitor computer(s) 104 may include or be communicatively coupled to radio hardware components such as software defined radio components made by Ettus Research of Austin, Tex. In some embodiments, portions of software defined radio functionality are provided by GNU Radio, maintained by the Free Software Foundation.

In FIG. 3, classification model computer(s) 108, RF signal characterization model(s) 114, speech activity model(s) 116, audio content model(s) 118 are used to store and operate N models, where N is a positive integer. That is, an embodiment of computing system 300 may include any number of models 114, 116 118. Examples of RF signal characterization model(s) 114 are mathematical models that have been trained to recognize RF signals of particular modulation types. Examples of speech activity model(s) 116 are mathematical models that have been trained to recognize speech activity in RF signals. Examples of audio content model(s) 118 are speaker models, which can be used for speaker recognition, speaker identification, speaker verification, and language models, which can be used for language recognition. Audio content model(s) 118 can include models of other categories of audio content, such as models that have been trained to recognize particular acoustic events or particular keywords, gender, emotion, etc.

As used herein, the term model may refer to a combination of digital data and programming logic that embodies a computerized representation of logical and/or mathematical relationships between data elements. For example, a speaker model usable by a computer that performs automated speaker identification stores data that indicates relationships between audio characterization data and speaker identifying data, while a language model usable by a computer stores data that indicates relationships between audio characterization data and language identifying data. In short, a model tells the computer how to recognize a particular semantic class (such as speaker or language) when the computer processes RF signal data. Models 114, 116, 118 may be implemented using any one or more of the following supervised machine learning, a neural network, a deep neural network, a cyclostationary process.

Any of models 114, 116, 118 may be trained using positive and/or negative examples of a semantic class that is desired to be recognized in the RF signal data. For instance, an RF signal characterization model 114 may be trained using segments of RF signal data of a particular modulation type and a background model. A speech activity model 116 may be trained using segments of RF signal data that include speech and a background model. A speaker model 118 used for automated speaker identification may be trained using a segment of pre-recorded speech of a particular speaker and a background model. Similarly, a language model 118 used for automated language identification may be trained using many segments of pre-recorded speech of a particular language and a background model.

In an embodiment, model(s) 114, 116, 118 includes individual models for each particular class that is desired to be detected in the RF signal data. The precise configuration of model(s) 114, 116, 118 depends on the particular application or task for which the disclosed technologies are being used.

Although computing system 300 may be implemented with any number N, where N is a positive integer, of classifier computer(s) 102, RF spectrum monitor computer(s) 104, classification model computer(s) 108, RF signal characterization model(s) 114, speech activity model(s) 116, audio content model(s) 118, computing devices 110, computing device 140, display device 142, antenna 144, respectively, in this disclosure, these elements may be referred to in the singular form for ease of discussion. Also, classifier computer(s) 102, RF spectrum monitor computer(s) 104, classification model computer(s) 108, RF signal characterization model(s) 114, speech activity model(s) 116, audio content model(s) 118, computing devices 110, computing device 140, display device 142, antenna 144, are shown as separate elements in FIG. 3 for ease of discussion but the illustration is not meant to imply that separation of these elements is required.

The illustrated systems and their functionality may be divided over any number of physical systems, including a single physical computer system, and can communicate with each other in any appropriate manner. For example, in some implementations classifier computer(s) 102, RF spectrum monitor computer(s) 104, classification model computer(s) 108, RF signal characterization model(s) 114, speech activity model(s) 116, audio content model(s) 118, computing device 110, computing device 140, display device 142, antenna 144, are all embodied in computing device 140.

Any of the components of computing system 300 may be equipped with input devices for purposes of obtaining input data. For example, computing device 140 may be equipped with or coupled to a radio antenna, a keyboard, keypad, touchscreen, touchpad, microphone, digital camera (still or video) or other sensing device(s) configured to obtain input data. Such input data is received by computing device 140 and routed to other components of the computing system 300 as described in this document or otherwise as needed.

Likewise, any of the components of computing system 300 may be equipped with output devices for purposes of presenting output. For example, computing device 140 may be equipped with or coupled to a display screen, touch screen, speaker, digital camera (still or video) or other output device(s) configured to output information. Such output data may be received from other components of the computing system 300 as described in this document or otherwise as needed. For example, a graphical user interface operated by computing device 140 may display graphics including dialog boxes and graphical content in order to facilitate the operations of any of the software components shown in FIG. 2.

In general, each of computing device(s) 110, 140, display device 142, antenna 144 and network 120 contains hardware components similar or analogous to corresponding components shown in FIG. 5, described below.

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired and wireless networks, as needed to enable communications between the computing device(s) 110, 140, 142.

Computing device 140 interfaces with computing devices 110 to establish logical connection(s) over network 120 with portions of classifier computer(s) 102, RF spectrum monitor computer(s) 104, classification model computer(s) 108, RF signal characterization model(s) 114, speech activity model(s) 116, audio content model(s) 118, at various times as needed for the operation of computing system 300.

Use Example: Intelligent Radio Tuning

Figure 4:
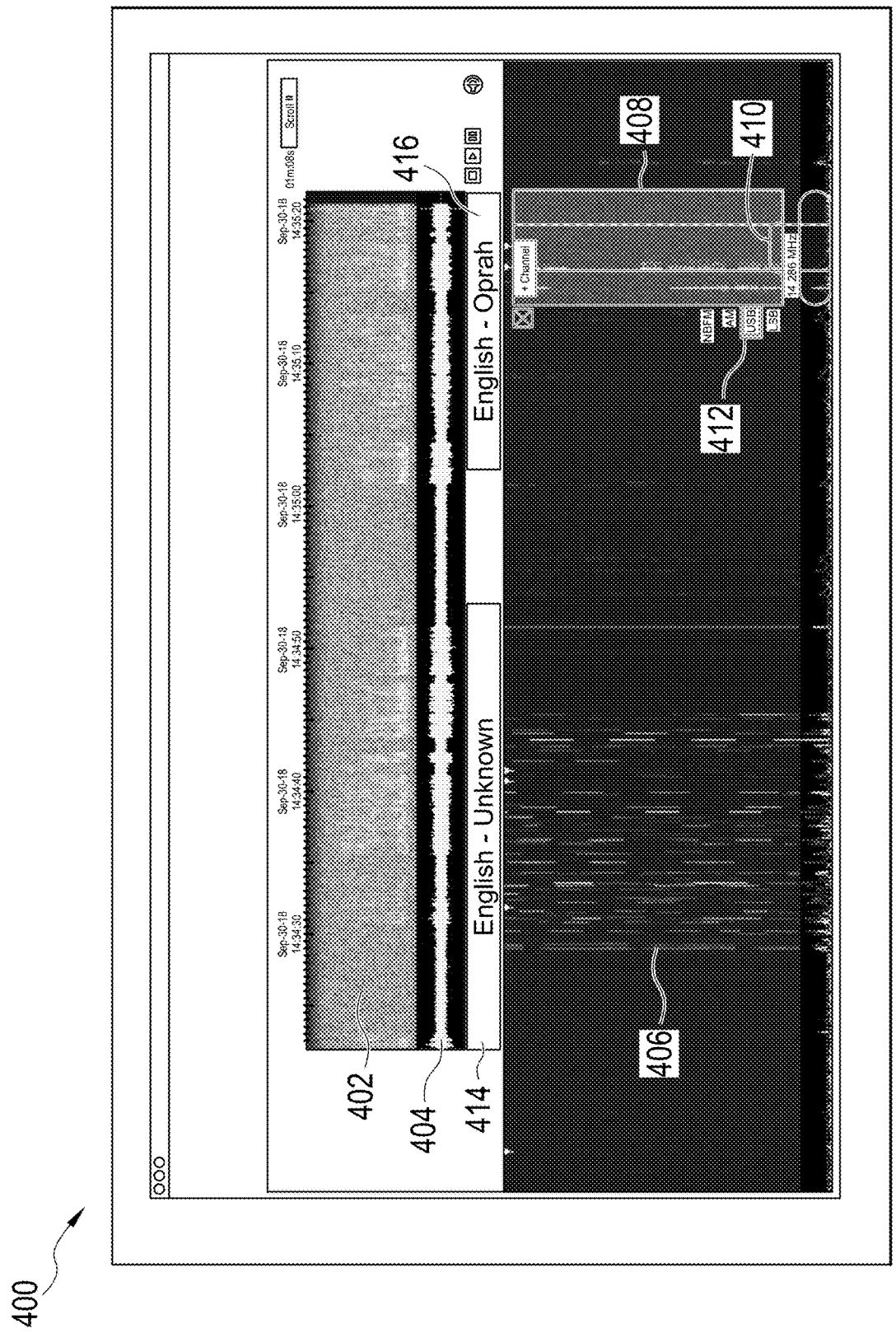
FIG. 4 is an example of a screen capture of a graphical user interface, in an embodiment.

FIG. 4 is an example of a screen capture of a graphical user interface (GUI) 400 that may be implemented in computing system 100, in which labels output by the disclosed technologies may be displayed and used to drive downstream computer functionality, in an embodiment.

GUI 400 includes a real-time display of RF signal data, 402, 406, which has been produced by a radio scanner receiving RF signals via, for example, antenna 144. The real-time display moves from the right side of the page to the left side of the page to show new data as time elapses while the RF signal data is being received. The real-time display includes frequency (band) data 402, 406, time-domain amplitude (waveform) data 404, a tuning window 408, labels 414, 416, a bandwidth adjuster 410, and a demodulation selector 412.

The "waterfalls" shown in frequency data 402 represent RF signals or blips detected at different radio frequencies where frequency is the y-axis and time is the x-axis. The "waterfalls" shown in frequency data 406 represent RF signals or blips detected at different radio frequencies where frequency is the x-axis and time is the y-axis). Waveform data 404 represents an audio signal transmitted on one of those frequencies, where time is the x-axis and amplitude is the y-axis.

Labels 414, 416 are output by audio content classifier software 66 as a result of analyzing characterization data associated with waveform data 404 using audio content models 118 that include at least one speaker model and at least one language model, in an embodiment.

In the example of FIG. 4, the user has entered search criteria including "language=English" and "Speaker=Oprah." In response, the system identifies a radio channel that contains audio matching the search criteria, for which it shows waveform data 404 and associated labels 414, 416. Label 414 indicates that speech has been detected in a first frequency band and the speech was spoken in the English language by an unknown speaker. Label 416 indicates that speech was detected in the same frequency band by a known speaker, Oprah. If audio matching the search criteria were to be found on another channel, the waveform and corresponding labels for that channel would be displayed as well.

Tuning window 408 enables a user of GUI 400 to adjust the tuning of the radio scanner by manipulating one or more interactive graphical elements of GUI 400. Tuning window 408 can be clicked on and dragged horizontally to the right or left to adjust the carrier frequency, i.e. to change or adjust the radio channel. Bandwidth adjuster 410 is an interactive graphical element configured such that clicking and dragging on the bandwidth adjuster graphical element 410 can increase or decrease the bandwidth area. Demodulation selector 412 is an interactive graphical element whereby a different demodulation type can be selected by clicking on the demodulation desired to be selected. Refinement of the tuning by manipulation of the controls 408, 410, 412 can be used to obtain finer-grain classifications or improve the accuracy of classifications that are output by the system.

In an embodiment, GUI 400 communicates directly with a radio scanner via an application program interface (API). Thus, via the API, manipulations of interactive elements of GUI 400 can be converted to control signals that control the radio scanner directly.

Other Applications

While this disclosure describes embodiments that analyze speech content of RF signals received during autonomous monitoring of an RF spectrum, aspects of the disclosed technologies are equally applicable to other forms of analysis of audio content of RF signals and to other technologies for receiving and processing RF signals. For example, aspects of the disclosed technologies are equally applicable to many types of RF signal classifications, including but not limited to speaker, language, keyword, speaker demographics such as age or gender, speaker emotional state, speaker physiological state, and/or classifications of non-speech audio such as types of background noise, types of non-speech sounds, sound volume, and more.

Additionally, portions of the technologies disclosed herein can be applied to digital audio, including but not limited to Internet Radio, for example by removing the processing steps that are specific to RF signal processing. In digital radio implementations, references herein to classification of RF signals may instead refer to radio signals, more generally.

Example Hardware Implementation

According to one embodiment, the techniques described herein are implemented by at least one computing device. For example, portions of the disclosed technologies may be at least temporarily implemented on a network including a combination of at least one server computer and/or other computing devices. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
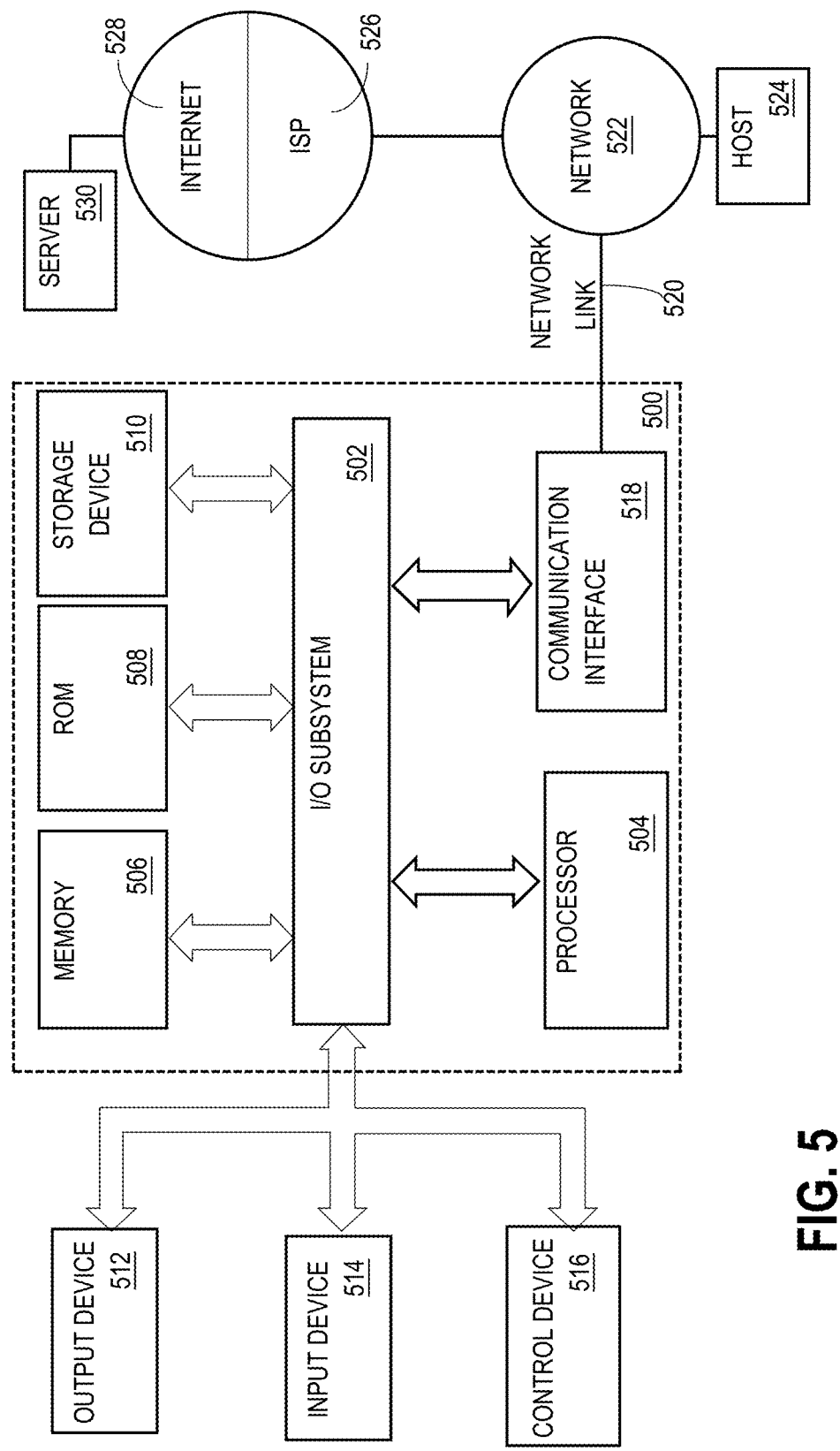
FIG. 5 is a block diagram that illustrates a hardware environment upon which an embodiment of the invention may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and at least one I/O port. The electronic signal paths are represented schematically in the drawings, for example as lines, unidirectional arrows, or bidirectional arrows.

At least one hardware processor 504 is coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to at least one output device 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

At least one input device 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, at least one ASIC or FPGA, firmware and/or program logic which in combination with the computer system causes or programs computer system 500 to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples or a combination of portions of the examples described below.

In an example 1, a method for finding content of interest in an RF spectrum includes: automatically scanning the RF spectrum; detecting, in a range of frequencies of the RF spectrum that includes one or more undefined channels, a candidate RF segment; where the candidate RF segment includes a frequency-bound time segment of electromagnetic energy; executing a machine learning-based process to determine, for the candidate RF segment, signal characterization data indicative of one or more of: a frequency range, a modulation type, a timestamp; using the signal characterization data to determine whether audio contained in the candidate RF segment corresponds to a search criterion; in response to determining that the candidate RF segment corresponds to the search criterion, outputting, through an electronic device, data indicative of the candidate RF segment; where the data indicative of the candidate RF segment is output in a real-time time interval after the candidate RF segment is detected; where the method is performed by one or more computing devices.

An example 2 includes the subject matter of example 1, including: executing an automated speech activity detection process on the candidate RF segment to determine whether the candidate RF segment includes speech content activity in the RF spectrum; in response to determining that the candidate RF segment includes speech content activity in the RF spectrum, outputting speech activity boundary data that defines a portion of the candidate RF segment that includes the speech content activity in the RF spectrum.

An example 3 includes the subject matter of example 2, including: in response to determining that the candidate RF segment includes speech content activity in the RF spectrum, using the speech activity boundary data to extract potentially matching audio characterization data from the candidate RF segment; inputting the potentially matching audio characterization data to one or more machine-learned models that have been trained to recognize, in a speech signal, one or more of: a particular speaker, a particular language, a particular keyword, a particular acoustic event; using the one or more machine-learned models, determining whether the potentially matching audio characterization data corresponds to the search criterion.

An example 4 includes the subject matter of example 3, including: using the signal characterization data, predicting the modulation type; using the modulation type, demodulating the candidate RF segment; extracting the potentially matching audio characterization data from the demodulated candidate RF segment.

An example 5 includes the subject matter of example 1, where using the signal characterization data to determine whether the candidate RF segment corresponds to the search criterion includes selecting one or more machine-learned models that have been trained to recognize, in an audio signal, one or more of: a particular speaker, a particular language, a particular keyword, a particular acoustic event, and applying the selected one or more machine-learned models to audio characterization data extracted from the candidate RF segment.

An example 6 includes the subject matter of example 1, including: detecting a second candidate RF segment that has second signal characterization data that is different than the signal characterization data of the candidate RF segment and contains audio that corresponds to the search criterion; outputting, through the electronic device, data indicative of the second candidate RF segment; where the data indicative of the second candidate RF segment is output in a real-time time interval after the second candidate RF segment is detected.

An example 7 includes the subject matter of example 6, including determining that the candidate RF segment and the second candidate RF segment both contain speech of a same speaker or a same language or a same keyword, where the candidate RF segment and the second candidate RF segment are both extracted from a same channel or the candidate RF segment and the second candidate RF segment are extracted from different channels and the candidate RF segment and the second candidate RF segment have a same timestamp or the candidate RF segment and the second candidate RF segment have different timestamps.

An example 8 includes the subject matter of example 6, including determining that the candidate RF segment and the second candidate RF segment both contain speech of a same speaker and the second candidate RF segment contains speech of the same speaker spoken in a different language than the candidate RF segment, where the candidate RF segment and the second candidate RF segment are extracted from different channels.

An example 9 includes the subject matter of example 6, including determining that the candidate RF segment and the second candidate RF segment both contain speech that includes a same keyword and the second candidate RF segment contains the same keyword spoken in a different language than the candidate RF segment, where the candidate RF segment and the second candidate RF segment are extracted from different channels.

An example 10 includes the subject matter of example 1, where executing the machine learning-based process includes using one or more of: a supervised machine learning algorithm, a neural network, a deep neural network, a cyclostationary process.

An example 11 includes the subject matter of example 1, where the automatically scanning is performed by a software defined radio and the software defined radio is embodied in one or more of: a computing device, a network of computing devices, an embedded system, a network appliance.

An example 12 includes the subject matter of example 6, including in response to determining that both the candidate RF segment and the second candidate RF segment include speech of a particular speaker, using geo-location data associated with the candidate RF segment and geo-location data associated with the second candidate RF segment to detect movement of the particular speaker from a first geo-location to a second geo-location.

In an example 13, one or more non-transitory computer-readable storage media including instructions which, when executed by one or more processors, cause finding content of interest in an RF spectrum by: automatically scanning the RF spectrum; detecting, in a range of frequencies of the RF spectrum that includes one or more undefined channels, a candidate RF segment; where the candidate RF segment includes a frequency-bound time segment of electromagnetic energy; executing a machine learning-based process to determine, for the candidate RF segment, signal characterization data indicative of one or more of: a frequency range, a modulation type, a timestamp; using the signal characterization data to determine whether audio contained in the candidate RF segment corresponds to a search criterion; in response to determining that the candidate RF segment corresponds to the search criterion, outputting, through an electronic device, data indicative of the candidate RF segment; where the data indicative of the candidate RF segment is output in a real-time time interval after the candidate RF segment is detected.

An example 14 includes the subject matter of claim 13, where the instructions, when executed by one or more processors, cause: executing an automated speech activity detection process on the candidate RF segment to determine whether the candidate RF segment includes speech content activity in the RF spectrum; in response to determining that the candidate RF segment includes speech content activity in the RF spectrum, outputting speech activity boundary data that defines a portion of the candidate RF segment that includes the speech content activity in the RF spectrum.

An example 15 includes the subject matter of example 14, where the instructions, when executed by one or more processors, cause: in response to determining that the candidate RF segment includes speech content activity in the RF spectrum, using the speech activity boundary data to extract potentially matching audio characterization data from the candidate RF segment; inputting the potentially matching audio characterization data to one or more machine-learned models that have been trained to recognize, in a speech signal, one or more of: a particular speaker, a particular language, a particular keyword, a particular acoustic event; using the one or more machine-learned models, determining whether the potentially matching audio characterization data corresponds to the search criterion.

An example 16 includes the subject matter of example 15, where the instructions, when executed by one or more processors, cause: using the signal characterization data, predicting the modulation type; using the modulation type, demodulating the candidate RF segment; extracting the potentially matching audio characterization data from the demodulated candidate RF segment.

An example 17 includes the subject matter of example 13, where using the signal characterization data to determine whether the candidate RF segment corresponds to the search criterion includes selecting one or more machine-learned models that have been trained to recognize, in an audio signal, one or more of: a particular speaker, a particular language, a particular keyword, a particular acoustic event, and applying the selected one or more machine-learned models to audio characterization data extracted from the candidate RF segment.

An example 18 includes the subject matter of example 13, where the instructions, when executed by one or more processors, cause: detecting a second candidate RF segment that has second signal characterization data that is different than the signal characterization data of the candidate RF segment and contains audio that corresponds to the search criterion; outputting, through the electronic device, data indicative of the second candidate RF segment; where the data indicative of the second candidate RF segment is output in a real-time time interval after the second candidate RF segment is detected.

An example 19 includes the subject matter of example 18, where the instructions, when executed by one or more processors, cause: determining that the candidate RF segment and the second candidate RF segment both contain speech of a same speaker or a same language or a same keyword, where the candidate RF segment and the second candidate RF segment are both extracted from a same channel or the candidate RF segment and the second candidate RF segment are extracted from different channels and the candidate RF segment and the second candidate RF segment have a same timestamp or the candidate RF segment and the second candidate RF segment have different timestamps.

An example 20 includes the subject matter of example 18, where the instructions, when executed by one or more processors, cause: determining that the candidate RF segment and the second candidate RF segment both contain speech of a same speaker and the second candidate RF segment contains speech of the same speaker spoken in a different language than the candidate RF segment, where the candidate RF segment and the second candidate RF segment are extracted from different channels.

An example 21 includes the subject matter of example 18, where the instructions, when executed by one or more processors, cause: determining that the candidate RF segment and the second candidate RF segment both contain speech that includes a same keyword and the second candidate RF segment contains the same keyword spoken in a different language than the candidate RF segment, where the candidate RF segment and the second candidate RF segment are extracted from different channels.

An example 22 includes the subject matter of example 18, where the instructions, when executed by one or more processors, cause: in response to determining that both the candidate RF segment and the second candidate RF segment include speech of a particular speaker, using geo-location data associated with the candidate RF segment and geo-location data associated with the second candidate RF segment to detect movement of the particular speaker from a first geo-location to a second geo-location.

An example 23 includes the subject matter of example 13, where executing the machine learning-based process includes using one or more of: a supervised machine learning algorithm, a neural network, a deep neural network, a cyclostationary process.

An example 24 includes the subject matter of example 13, where the automatically scanning is performed by a software defined radio and the software defined radio is embodied in one or more of: a computing device, a network of computing devices, an embedded system, a network appliance.

In an example 25, a system includes: one or more processors; one or more storage media storing instructions which, when executed by the one or more processors, cause: automatically scanning an RF spectrum; detecting, in a range of frequencies of the RF spectrum that includes one or more undefined channels, a candidate RF segment; where the candidate RF segment includes a frequency-bound time segment of electromagnetic energy; executing a machine learning-based process to determine, for the candidate RF segment, signal characterization data indicative of one or more of: a frequency range, a modulation type, a timestamp; using the signal characterization data to determine whether audio contained in the candidate RF segment corresponds to a search criterion; in response to determining that the candidate RF segment corresponds to the search criterion, outputting, through an electronic device, data indicative of the candidate RF segment; where the data indicative of the candidate RF segment is output in a real-time time interval after the candidate RF segment is detected.

An example 26 includes the subject matter of example 25, where the instructions, when executed by one or more processors, cause: executing an automated speech activity detection process on the candidate RF segment to determine whether the candidate RF segment includes speech content activity in the RF spectrum; in response to determining that the candidate RF segment includes speech content activity in the RF spectrum, outputting speech activity boundary data that defines a portion of the candidate RF segment that includes the speech content activity in the RF spectrum.

An example 27 includes the subject matter of example 26, where the instructions, when executed by one or more processors, cause: in response to determining that the candidate RF segment includes speech content activity in the RF spectrum, using the speech activity boundary data to extract potentially matching audio characterization data from the candidate RF segment; inputting the potentially matching audio characterization data to one or more machine-learned models that have been trained to recognize, in a speech signal, one or more of: a particular speaker, a particular language, a particular keyword, a particular acoustic event; using the one or more machine-learned models, determining whether the potentially matching audio characterization data corresponds to the search criterion.

An example 28 includes the subject matter of example 27, where the instructions, when executed by one or more processors, cause: using the signal characterization data, predicting the modulation type; using the modulation type, demodulating the candidate RF segment; extracting the potentially matching audio characterization data from the demodulated candidate RF segment.

An example 29 includes the subject matter of example 25, where using the signal characterization data to determine whether the candidate RF segment corresponds to the search criterion includes selecting one or more machine-learned models that have been trained to recognize, in an audio signal, one or more of: a particular speaker, a particular language, a particular keyword, a particular acoustic event, and applying the selected one or more machine-learned models to audio characterization data extracted from the candidate RF segment.

An example 30 includes the subject matter of example 25, where the instructions, when executed by one or more processors, cause: detecting a second candidate RF segment that has second signal characterization data that is different than the signal characterization data of the candidate RF segment and contains audio that corresponds to the search criterion; outputting, through the electronic device, data indicative of the second candidate RF segment; where the data indicative of the second candidate RF segment is output in a real-time time interval after the second candidate RF segment is detected.

An example 31 includes the subject matter of example 30, where the instructions, when executed by one or more processors, cause: determining that the candidate RF segment and the second candidate RF segment both contain speech of a same speaker or a same language or a same keyword, where the candidate RF segment and the second candidate RF segment are both extracted from a same channel or the candidate RF segment and the second candidate RF segment are extracted from different channels and the candidate RF segment and the second candidate RF segment have a same timestamp or the candidate RF segment and the second candidate RF segment have different timestamps.

An example 32 includes the subject matter of example 30, where the instructions, when executed by one or more processors, cause: determining that the candidate RF segment and the second candidate RF segment both contain speech of a same speaker and the second candidate RF segment contains speech of the same speaker spoken in a different language than the candidate RF segment, where the candidate RF segment and the second candidate RF segment are extracted from different channels.

An example 33 includes the subject matter of example 30, where the instructions, when executed by one or more processors, cause: determining that the candidate RF segment and the second candidate RF segment both contain speech that includes a same keyword and the second candidate RF segment contains the same keyword spoken in a different language than the candidate RF segment, where the candidate RF segment and the second candidate RF segment are extracted from different channels.

An example 34 includes the subject matter of example 30, where the instructions, when executed by one or more processors, cause: in response to determining that both the candidate RF segment and the second candidate RF segment include speech of a particular speaker, using geo-location data associated with the candidate RF segment and geo-location data associated with the second candidate RF segment to detect movement of the particular speaker from a first geo-location to a second geo-location.

An example 36 includes the subject matter of example 25, where executing the machine learning-based process includes using one or more of: a supervised machine learning algorithm, a neural network, a deep neural network, a cyclostationary process.

An example 37 includes the subject matter of example 25, where the automatically scanning is performed by a software defined radio and the software defined radio is embodied in one or more of: a computing device, a network of computing devices, an embedded system, a network appliance.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

What is claimed is:

1. A method for finding content of interest in a radio frequency (RF) spectrum, the method comprising:
   automatically scanning the RF spectrum;
   detecting, in a range of frequencies of the RF spectrum that includes one or more undefined channels, a candidate RF segment;
   wherein the candidate RF segment comprises a frequency-bound time segment of electromagnetic energy;
   executing a machine learning-based process to determine, for the candidate RF segment, signal characterization data indicative of one or more of: a frequency range, a modulation type, a timestamp;
   using the signal characterization data to determine whether audio contained in the candidate RF segment corresponds to a search criterion;
   in response to determining that the candidate RF segment corresponds to the search criterion, outputting, through an electronic device, data indicative of the candidate RF segment;
   wherein the data indicative of the candidate RF segment is output in a real-time time interval after the candidate RF segment is detected;
   executing an automated speech activity detection process on the candidate RF segment to determine whether the candidate RF segment comprises speech content activity in the RF spectrum; and
   in response to determining that the candidate RF segment comprises speech content activity in the RF spectrum, outputting speech activity boundary data that defines a portion of the candidate RF segment that comprises the speech content activity in the RF spectrum;
   wherein the method is performed by one or more computing devices.

2. The method of claim 1, comprising:
   in response to determining that the candidate RF segment comprises speech content activity in the RF spectrum, using the speech activity boundary data to extract potentially matching audio characterization data from the candidate RF segment;
   inputting the potentially matching audio characterization data to one or more machine-learned models that have been trained to recognize, in a speech signal: (i) a particular speaker, iii) a particular language, (iii) a particular keyword, (iv) a particular acoustic event, or (v) at least two of (i), (ii), (iii) and (iv); and
   using the one or more machine-learned models, determining whether the potentially matching audio characterization data corresponds to the search criterion.

3. The method of claim 2, comprising:
   using the signal characterization data, predicting the modulation type;
   using the modulation type, demodulating the candidate RF segment; and
   extracting the potentially matching audio characterization data from the demodulated candidate RF segment.

4. The method of claim 1, wherein using the signal characterization data to determine whether the candidate RF segment corresponds to the search criterion comprises selecting one or more machine-learned models that have been trained to recognize, in an audio signal: (i) a particular speaker, (ii) a particular language, (iii) a particular keyword, (iv) a particular acoustic event, or (v) at least two of (i), (ii), (iii) and (iv); and applying the selected one or more machine-learned models to audio characterization data extracted from the candidate RF segment.

5. The method of claim 1, comprising:
- detecting a second candidate RF segment that has second signal characterization data that is different than the signal characterization data of the candidate RF segment and contains audio that corresponds to the search criterion; and
- outputting, through the electronic device, data indicative of the second candidate RF segment;
- wherein the data indicative of the second candidate RF segment is output in a real-time time interval after the second candidate RF segment is detected.

6. The method of claim 5, comprising determining that the candidate RF segment and the second candidate RF segment both contain speech of a same speaker or a same language or a same keyword, wherein the candidate RF segment and the second candidate RF segment are both extracted from a same channel or the candidate RF segment and the second candidate RF segment are extracted from different channels and the candidate RF segment and the second candidate RF segment have a same timestamp or the candidate RF segment and the second candidate RF segment have different timestamps.

7. The method of claim 5, comprising determining that the candidate RF segment and the second candidate RF segment both contain speech of a same speaker and the second candidate RF segment contains speech of the same speaker spoken in a different language than the candidate RF segment, wherein the candidate RF segment and the second candidate RF segment are extracted from different channels.

8. The method of claim 5, comprising determining that the candidate RF segment and the second candidate RF segment both contain speech that includes a same keyword and the second candidate RF segment contains the same keyword spoken in a different language than the candidate RF segment, wherein the candidate RF segment and the second candidate RF segment are extracted from different channels.

9. The method of claim 1, wherein executing the machine learning-based process comprises using: (i) a supervised machine learning algorithm, (ii) a neural network, (iii) a deep neural network, (iv) a cyclostationary process, or (v) at least two of (i), (ii), (iii) and (iv).

10. The method of claim 1, wherein the automatically scanning is performed by a software defined radio and the software defined radio is embodied in: (i) a computing device, iii) a network of computing devices, (iii) an embedded system, (iv) a network appliance, or (v) at least two of (i), (ii), (iii) and (iv).

11. The method of claim 5, comprising in response to determining that both the candidate RF segment and the second candidate RF segment include speech of a particular speaker, using geo-location data associated with the candidate RF segment and geo-location data associated with the second candidate RF segment to detect movement of the particular speaker from a first geo-location to a second geo-location.

12. One or more non-transitory computer-readable storage media comprising instructions which, when executed by one or more processors, cause finding content of interest in a radio frequency (RF) spectrum by:
- automatically scanning the RF spectrum;
- detecting, in a range of frequencies of the RF spectrum that includes one or more undefined channels, a candidate RF segment;
- wherein the candidate RF segment comprises a frequency-bound time segment of electromagnetic energy;
- executing a machine learning-based process to determine, for the candidate RF segment, signal characterization data indicative of one or more of: a frequency range, a modulation type, a timestamp;
- using the signal characterization data to determine whether audio contained in the candidate RF segment corresponds to a search criterion;
- in response to determining that the candidate RF segment corresponds to the search criterion, outputting, through an electronic device, data indicative of the candidate RF segment;
- wherein the data indicative of the candidate RF segment is output in a real-time time interval after the candidate RF segment is detected;
- executing an automated speech activity detection process on the candidate RF segment to determine whether the candidate RF segment comprises speech content activity in the RF spectrum; and
- in response to determining that the candidate RF segment comprises speech content activity in the RF spectrum, outputting speech activity boundary data that defines a portion of the candidate RF segment that comprises the speech content activity in the RF spectrum.

13. The one or more non-transitory computer-readable storage media of claim 12, wherein the instructions, when executed by one or more processors, cause:
- in response to determining that the candidate RF segment comprises speech content activity in the RF spectrum, using the speech activity boundary data to extract potentially matching audio characterization data from the candidate RF segment;
- inputting the potentially matching audio characterization data to one or more machine-learned models that have been trained to recognize, in a speech signal: (i) a particular speaker, iii) a particular language, (iii) a particular keyword, (iv) a particular acoustic event, or (v) at least two of (i), (ii), (iii) and (iv); and
- using the one or more machine-learned models, determining whether the potentially matching audio characterization data corresponds to the search criterion.

14. The one or more non-transitory computer-readable storage media of claim 13, wherein the instructions, when executed by one or more processors, cause:
- using the signal characterization data, predicting the modulation type;
- using the modulation type, demodulating the candidate RF segment; and
- extracting the potentially matching audio characterization data from the demodulated candidate RF segment.

15. The one or more non-transitory computer-readable storage media of claim 12, wherein using the signal characterization data to determine whether the candidate RF segment corresponds to the search criterion comprises selecting one or more machine-learned models that have been trained to recognize, in an audio signal: (i) a particular speaker, iii) a particular language, (iii) a particular keyword, (iv) a particular acoustic event, or (v) at least two of (i), (ii), (iii) and (iv); and applying the selected one or more machine-learned models to audio characterization data extracted from the candidate RF segment.

16. The one or more non-transitory computer-readable storage media of claim 12, wherein the instructions, when executed by one or more processors, cause:
- detecting a second candidate RF segment that has second signal characterization data that is different than the signal characterization data of the candidate RF segment and contains audio that corresponds to the search criterion; and outputting, through the electronic device, data indicative of the second candidate RF segment;

wherein the data indicative of the second candidate RF segment is output in a real-time time interval after the second candidate RF segment is detected.

17. The one or more non-transitory computer-readable storage media of claim 16, wherein the instructions, when executed by one or more processors, cause:

determining that the candidate RF segment and the second candidate RF segment both contain speech of a same speaker or a same language or a same keyword, wherein the candidate RF segment and the second candidate RF segment are both extracted from a same channel or the candidate RF segment and the second candidate RF segment are extracted from different channels and the candidate RF segment and the second candidate RF segment have a same timestamp or the candidate RF segment and the second candidate RF segment have different timestamps.

18. The one or more non-transitory computer-readable storage media of claim 16, wherein the instructions, when executed by one or more processors, cause:

determining that the candidate RF segment and the second candidate RF segment both contain speech of a same speaker and the second candidate RF segment contains speech of the same speaker spoken in a different language than the candidate RF segment, wherein the candidate RF segment and the second candidate RF segment are extracted from different channels.

19. The one or more non-transitory computer-readable storage media of claim 16, wherein the instructions, when executed by one or more processors, cause:

determining that the candidate RF segment and the second candidate RF segment both contain speech that includes a same keyword and the second candidate RF segment contains the same keyword spoken in a different language than the candidate RF segment, wherein the candidate RF segment and the second candidate RF segment are extracted from different channels.

20. The one or more non-transitory computer-readable storage media of claim 16, wherein the instructions, when executed by one or more processors, cause:

in response to determining that both the candidate RF segment and the second candidate RF segment include speech of a particular speaker, using geo-location data associated with the candidate RF segment and geo-location data associated with the second candidate RF segment to detect movement of the particular speaker from a first geo-location to a second geo-location.

21. The one or more non-transitory computer-readable storage media of claim 12, wherein executing the machine learning-based process comprises using one: (i) a supervised machine learning algorithm, (ii) a neural network, (iii) a deep neural network, (iv) a cyclostationary process, or (v) at least two of (i), (ii), (iii) and (iv).

22. The one or more non-transitory computer-readable storage media of claim 12, wherein the automatically scanning is performed by a software defined radio and the software defined radio is embodied in: (i) a computing device, iii) a network of computing devices, (iii) an embedded system, (iv) a network appliance, or (v) at least two of (i), (ii), (iii) and (iv).

23. A system comprising:
one or more processors;
one or more storage media storing instructions which, when executed by the one or more processors, cause:
automatically scanning a radio frequency (RF) spectrum;
detecting, in a range of frequencies of the RF spectrum that includes one or more undefined channels, a candidate RF segment;
wherein the candidate RF segment comprises a frequency-bound time segment of electromagnetic energy;
executing a machine learning-based process to determine, for the candidate RF segment, signal characterization data indicative of one or more of: a frequency range, a modulation type, a timestamp;
using the signal characterization data to determine whether audio contained in the candidate RF segment corresponds to a search criterion;
in response to determining that the candidate RF segment corresponds to the search criterion, outputting, through an electronic device, data indicative of the candidate RF segment;
wherein the data indicative of the candidate RF segment is output in a real-time time interval after the candidate RF segment is detected;
executing an automated speech activity detection process on the candidate RF segment to determine whether the candidate RF segment comprises speech content activity in the RF spectrum; and
in response to determining that the candidate RF segment comprises speech content activity in the RF spectrum, outputting speech activity boundary data that defines a portion of the candidate RF segment that comprises the speech content activity in the RF spectrum.

24. The system of claim 23, wherein the instructions, when executed by one or more processors, cause:

in response to determining that the candidate RF segment comprises speech content activity in the RF spectrum, using the speech activity boundary data to extract potentially matching audio characterization data from the candidate RF segment;
inputting the potentially matching audio characterization data to one or more machine-learned models that have been trained to recognize, in a speech signal: (i) a particular speaker, (ii) a particular language, (iii) a particular keyword, (iv) a particular acoustic event, or (v) at least two of (i), (ii), (iii) and (iv); and
using the one or more machine-learned models, determining whether the potentially matching audio characterization data corresponds to the search criterion.

25. The system of claim 24, wherein the instructions, when executed by one or more processors, cause:

using the signal characterization data, predicting the modulation type;
using the modulation type, demodulating the candidate RF segment; and
extracting the potentially matching audio characterization data from the demodulated candidate RF segment.

26. The system of claim 23, wherein using the signal characterization data to determine whether the candidate RF segment corresponds to the search criterion comprises selecting one or more machine-learned models that have been trained to recognize, in an audio signal: (i) a particular speaker, iii) a particular language, (iii) a particular keyword, (iv) a particular acoustic event, or (v) at least two of (i), (ii), (iii) and (iv); and applying the selected one or more machine-learned models to audio characterization data extracted from the candidate RF segment.

27. The system of claim 23, wherein the instructions, when executed by one or more processors, cause:
- detecting a second candidate RF segment that has second signal characterization data that is different than the signal characterization data of the candidate RF segment and contains audio that corresponds to the search criterion; and
- outputting, through the electronic device, data indicative of the second candidate RF segment;
- wherein the data indicative of the second candidate RF segment is output in a real-time time interval after the second candidate RF segment is detected.

28. The system of claim 27, wherein the instructions, when executed by one or more processors, cause:
- determining that the candidate RF segment and the second candidate RF segment both contain speech of a same speaker or a same language or a same keyword, wherein the candidate RF segment and the second candidate RF segment are both extracted from a same channel or the candidate RF segment and the second candidate RF segment are extracted from different channels and the candidate RF segment and the second candidate RF segment have a same timestamp or the candidate RF segment and the second candidate RF segment have different timestamps.

29. The system of claim 27, wherein the instructions, when executed by one or more processors, cause:
- determining that the candidate RF segment and the second candidate RF segment both contain speech of a same speaker and the second candidate RF segment contains speech of the same speaker spoken in a different language than the candidate RF segment, wherein the candidate RF segment and the second candidate RF segment are extracted from different channels.

30. The system of claim 27, wherein the instructions, when executed by one or more processors, cause:
- determining that the candidate RF segment and the second candidate RF segment both contain speech that includes a same keyword and the second candidate RF segment contains the same keyword spoken in a different language than the candidate RF segment, wherein the candidate RF segment and the second candidate RF segment are extracted from different channels.

31. The system of claim 27, wherein the instructions, when executed by one or more processors, cause:
- in response to determining that both the candidate RF segment and the second candidate RF segment include speech of a particular speaker, using geo-location data associated with the candidate RF segment and geo-location data associated with the second candidate RF segment to detect movement of the particular speaker from a first geo-location to a second geo-location.

32. The system of claim 23, wherein executing the machine learning-based process comprises using: (i) a supervised machine learning algorithm, (ii) a neural network, (iii) a deep neural network, (iv) a cyclostationary process, or (v) at least two of (i), (ii), (iii) and (iv).

33. The system of claim 23, wherein the automatically scanning is performed by a software defined radio and the software defined radio is embodied in: (i) a computing device, iii) a network of computing devices, (iii) an embedded system, (iv) a network appliance, or (v) at least two of (i), (ii), (iii) and (iv).

* * * * *